(12) United States Patent
Wilkens et al.

(10) Patent No.: US 8,408,608 B2
(45) Date of Patent: Apr. 2, 2013

(54) HOOD HOLD DOWN DEVICE

(75) Inventors: Jonathan F. Wilkens, Seattle, WA (US);
Michael J. Fanning, Renton, WA (US);
Charles Baer, Bellevue, WA (US)

(73) Assignee: PACCAR Inc, Bellevue, WA (US)

( * ) Notice: Subject to any disclaimer, the term of this patent is extended or adjusted under 35 U.S.C. 154(b) by 168 days.

(21) Appl. No.: 12/962,461

(22) Filed: Dec. 7, 2010

(65) Prior Publication Data
US 2012/0139296 A1  Jun. 7, 2012

(51) Int. Cl.
*B65D 45/00*  (2006.01)
*B65D 45/34*  (2006.01)
(52) U.S. Cl. .... 292/256; 292/63; 292/241; 292/DIG. 49
(58) Field of Classification Search ............ 292/63, 292/66, 97, 101, 109, 113, 241, 247, 256, 292/256.69, DIG. 14, DIG. 38, DIG. 49
See application file for complete search history.

(56) References Cited

U.S. PATENT DOCUMENTS

| 1,827,319 | A | * | 10/1931 | Komenak | 70/73 |
|---|---|---|---|---|---|
| 2,818,596 | A | * | 1/1958 | Martinec | 15/327.2 |
| 3,466,076 | A | * | 9/1969 | Bisbing | 292/109 |
| 3,985,380 | A | * | 10/1976 | Raivio | 292/69 |
| 4,184,705 | A | * | 1/1980 | Little | 292/247 |
| 4,540,206 | A | * | 9/1985 | Frame et al. | 292/66 |
| 4,705,308 | A | * | 11/1987 | Bisbing | 292/108 |
| 4,782,673 | A | * | 11/1988 | Castelli et al. | 70/72 |
| 4,830,413 | A | * | 5/1989 | Bisbing | 292/247 |
| 5,024,471 | A | * | 6/1991 | Kahl et al. | 292/97 |
| 5,127,684 | A | * | 7/1992 | Klotz et al. | 292/113 |
| 5,624,142 | A | * | 4/1997 | Watson et al. | 292/241 |
| 5,826,672 | A |  | 10/1998 | Holter |  |
| 5,890,556 | A |  | 4/1999 | Shearn |  |
| 6,073,979 | A | * | 6/2000 | Nawalaniec et al. | 292/256 |
| 6,217,835 | B1 | * | 4/2001 | Riley et al. | 422/297 |
| 6,257,631 | B1 | * | 7/2001 | Sokurenko et al. | 292/247 |
| 6,345,846 | B1 | * | 2/2002 | DeRees et al. | 292/241 |
| 6,457,750 | B1 | * | 10/2002 | Sokurenko et al. | 292/113 |
| 7,017,955 | B1 | * | 3/2006 | Chiang | 292/113 |
| 2002/0166707 | A1 |  | 11/2002 | Palenchar |  |
| 2006/0207817 | A1 |  | 9/2006 | Tucker |  |

OTHER PUBLICATIONS

International Search Report and Written Opinion mailed Feb. 2, 2011, issued in corresponding International Application No. PCT/US2010/059308, filed Dec. 7, 2010.

* cited by examiner

*Primary Examiner* — Carlos Lugo
(74) *Attorney, Agent, or Firm* — Christensen O'Connor Johnson Kindness PLLC

(57) ABSTRACT

A hood hold down device for securing a vehicle hood to a cab includes a cab mount assembly securable to a portion of the cab and a hood mount assembly securable to a portion of the hood. The hood hold down device further includes a linkage assembly extending from the cab mount assembly and a handle moveably coupled to the linkage assembly, wherein the handle is releasably securable to the hood mount assembly to secure the hood to the cab.

14 Claims, 8 Drawing Sheets

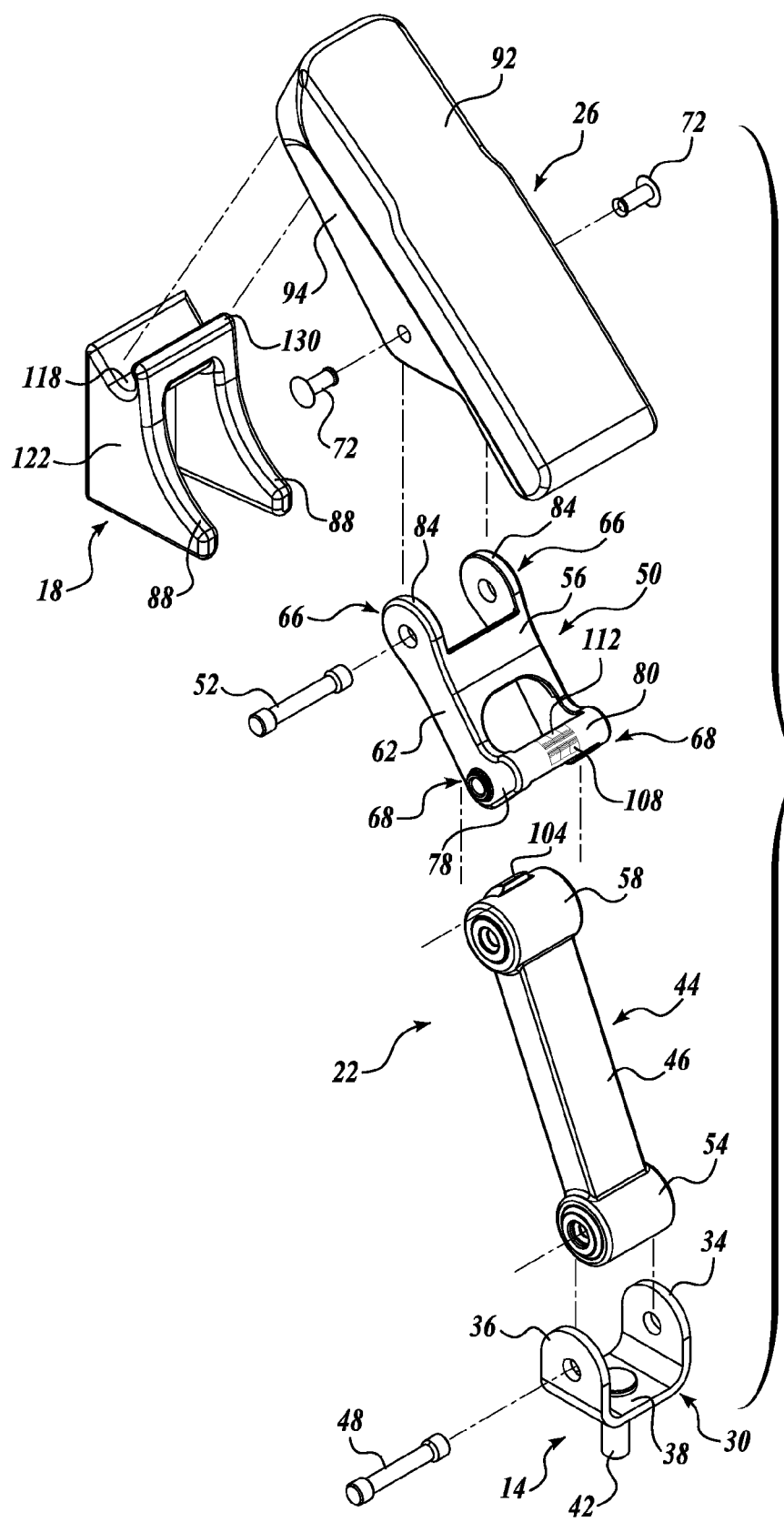

HOOD HOLD DOWN DEVICE

BACKGROUND

Heavy-duty trucks typically include a chassis, an engine engaged on the chassis, a hood for enclosing the engine, and a cab mounted on the chassis. It is often desirous to have an air suspension system or other suitable system that allows the cab to move independently of the chassis to provide the driver and passengers with added comfort. More specifically, the cab normally moves fore and aft and up and down relative to the chassis in response to changing conditions on the road.

Conventional heavy duty trucks have a large, engine-covering hood which tilts about a transverse pivot point located above the bumper to expose the engine for servicing. The hood may be mounted at its forward end to the forward end of the chassis, and the hood may be mounted at its rear end to a portion of the cab. Fixed connections between the chassis and the cab (through the hood) prevent the fore and aft cab movement and the up and down cab movement required of the cab suspension system. Thus, it is desirous to have a hood mounting system that secures the hood to the cab in a manner that accommodates the movement of the cab relative to the hood and chassis.

SUMMARY

The present disclosure provides a hood hold down device for securing a vehicle hood to a cab. The hood hold down device includes a cab mount assembly securable to a portion of the cab and a hood mount assembly securable to a portion of the hood. The hood hold down device further includes a linkage assembly extending from the cab mount assembly and a handle moveably secured to the linkage assembly, wherein the handle is releasably securable to the hood mount assembly to secure the hood to the cab.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein:

FIG. 4 is an exploded view of the hood hold down device of FIG. 1;

DETAILED DESCRIPTION

Figure 1:
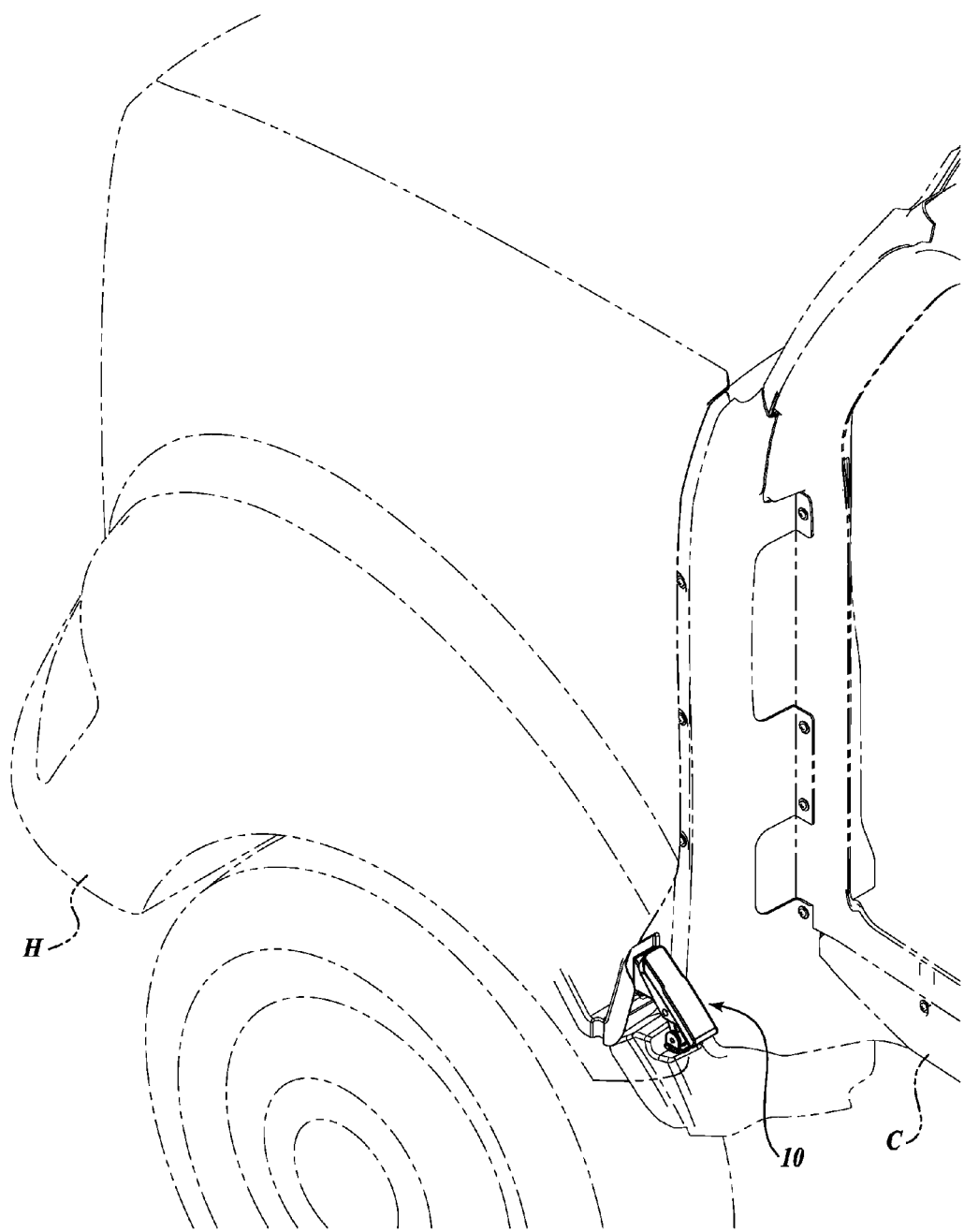
FIG. 1 is an environment view of a representative embodiment of a hood hold down device shown coupling a hood to a portion of a vehicle.
Figure 2:
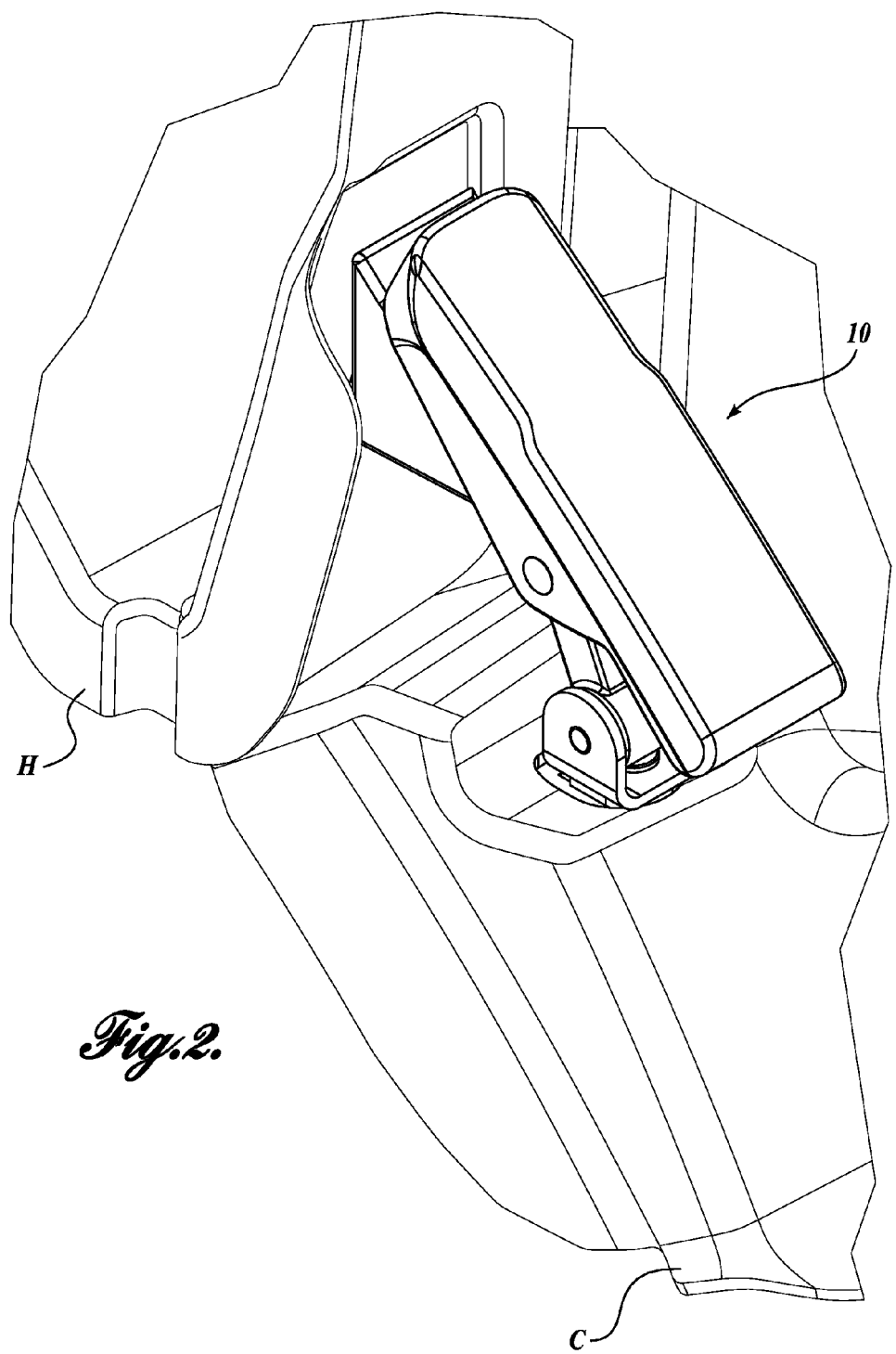
FIG. 2 is an isometric view of the hood hold down device of FIG. 1 shown coupling a hood to a portion of a vehicle.

A hood hold down device 10 constructed in accordance with one embodiment of the present disclosure is best seen by referring to FIGS. 1 and 2. The hood hold down device 10 is shown in use with a heavy duty truck T having a cab C, a chassis (not shown), and a hood H. The hood H is pivotally coupled at its forward end to the chassis through a suitable hinge assembly (not shown) that is well known in the art. The hood H pivots about the hinge assembly to move between open and closed positions.

The hood hold down device 10 is used to securely mount the hood H to the cab C at a rearward portion of the hood H. It should be appreciated that any preferred hood and cab design may be used; and, therefore, the hood H and cab C shown in FIG. 1 should be seen as illustrative only and should not be taken as limiting the scope of the present disclosure. Moreover, from time to time throughout the description, directional terms, such as "upper," "lower," "clockwise," "counterclockwise," etc., may be used for ease of description of the hood hold down device 10. It should be appreciated that such terms are for illustrative purposes only and should not be taken as limiting the scope of the present disclosure.

Figure 3:
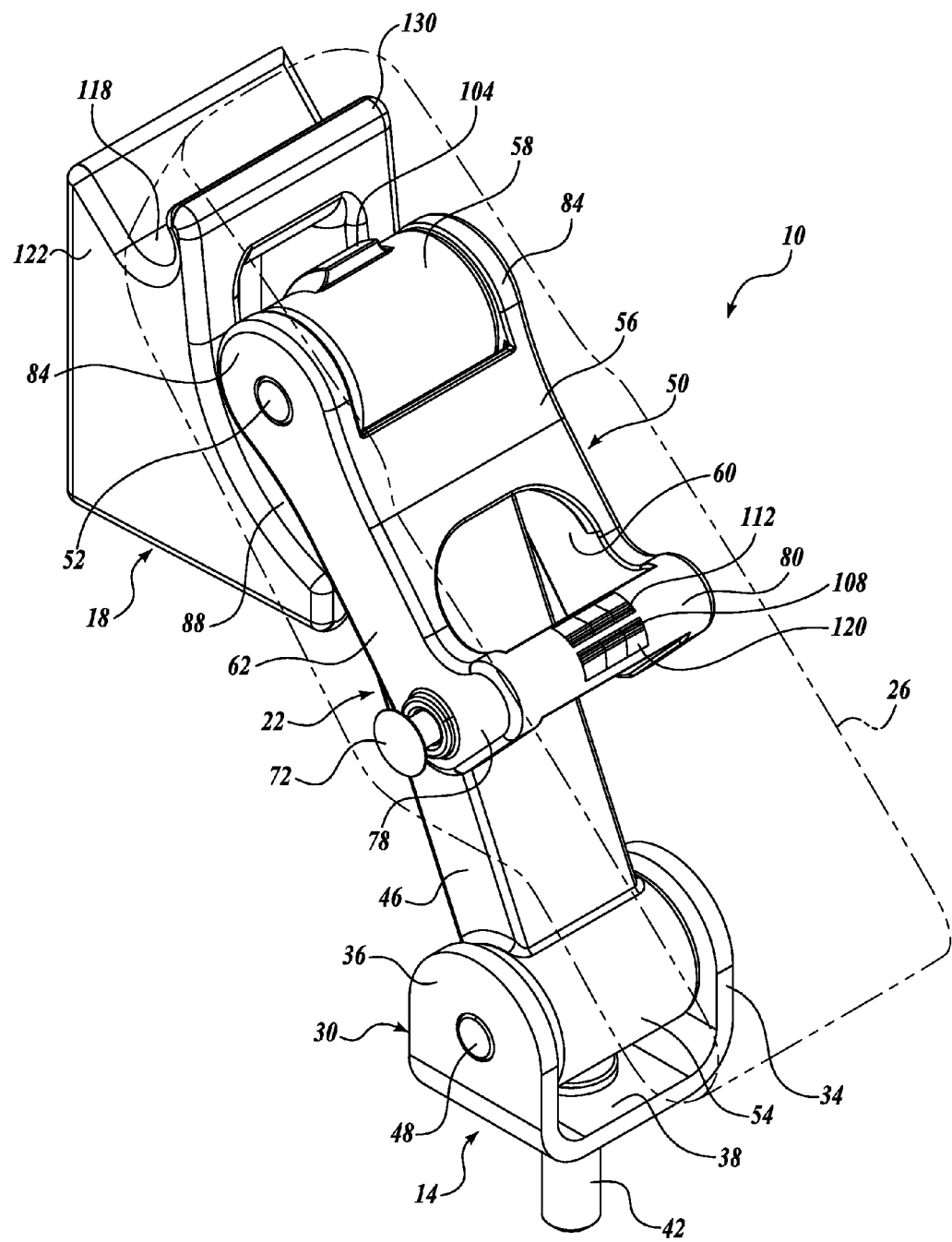
FIG. 3 is an isometric view of the hood hold down device of FIG. 1.

Referring to FIG. 3, the hood hold down device 10 will now be described in more detail. The hood hold down device 10 generally includes a cab mount assembly 14 securable to a portion of the cab C and a hood mount assembly 18 securable to a portion of the hood H. The hood hold down device 10 further includes a linkage assembly 22 extending from the cab mount assembly 14 and a handle 26 moveably secured to the linkage assembly 22, wherein the handle 26 is releasably securable to the hood mount assembly 18 to secure the hood H to the cab C.

Referring to FIG. 4, the cab mount assembly 14 is defined by a U-shaped bracket or yoke bracket 30 having first and second ears 34 and 36 and a transverse portion 38 extending between lower ends of the first and second ears 34 and 36. The mounting pin 42 is configured to pass through a portion of the cab C and be securely fastened to the cab C in any suitable manner (see FIG. 2). For instance, after passing the mounting pin 42 through the cab C, a fastener, such as a nut, may be received on a threaded end of the mounting pin.

The yoke bracket 30 is securable to an elastomeric link 46 of the linkage assembly 22. Specifically, a first pivot end 58 of the elastomeric link 46 is pivotally secured between the first and second ears 34 and 36 of the yoke bracket 30 by passing a pin 48 or other suitable fastener through the first and second ears 34 and 36 and the first end of the elastomeric link 46. The elastomeric link 46 can pivot about the pin 48 with respect to the yoke bracket 30.

The elastomeric link 46 includes an elongated body portion 46 extending from the first pivot end 54 to a second pivot end 58. The elongated body portion 46 is made from an elastomeric material such that it at least somewhat deformable and stretchable; however, it should be appreciated that the entire elastomeric link may be made from an elastomeric material. The elastomeric link 46 may be made from any suitable elastomeric material, such as rubber. In this manner, the elongated body portion 46 may twist, bend, stretch, etc., when securing the handle 26 to the hood mount assembly 18 to accommodate misalignment between the hood H and the cab C or movement of the cab C with respect to the hood H, as will be described in further detail below. Moreover, with the first and second pivot ends 54 and 58 made from an elastomeric material, the first and second pivot ends 54 and 58 help dampen any vibration or movement at the first and second pivot ends 54 and 58.

The linkage assembly 22 further includes a cam link 50 moveably secured to the second pivot end 58 of the elastomeric link 48 through a pin 52 or other suitable fastener. The cam link 50 is made from a suitably rigid material, such as plastic, metal, etc., and the cam link 50 is suitably shaped and sized to act as a cam against a portion of the hood mount assembly 18 and the handle 26 when opening or closing the hood hold down device 10.

More specifically, the cam link 50 includes a body portion 56 extending substantially transversely between first and second opposing cam plates 60 and 62. The cam plates 60 and 62 each have first and second pivot ends 66 and 68 that are configured to be pivotally secured to the elastomeric link 44 and the handle 26, respectively. In particular, the first and second cam plates 60 and 62 are suitably spaced apart to receive the second pivot end 58 of the elastomeric link 44 therein. The first pivot end 66 of each cam plate 60 and 62 also includes an opening for receiving a fastener, such as pin 52, therein. As such, the pin 52 passes through the openings in the first pivot ends 66 and through a transverse opening in the second pivot end 58 of the elastomeric link 44 to pivotally secure the second pivot end 58 of the elastomeric link 44 between the first pivot ends 66 of the first and second cam plates 60 and 62.

A stop 104 may be formed on the exterior surface of the second pivot end 58 of the elastomeric link 44 to help limit the movement of the cam link 50 relative to the elastomeric link 44. The stop 104 is engageable with an edge of the body portion 56 of the cam link 50 as the cam link 50 is pivoted about pin 52 in a counterclockwise direction. The stop 104 fixes the position of the cam link 50 relative to the elastomeric link 44 when the cam link 50 has been rotated counterclockwise a predetermined amount about the pivot axis defined by pin 52. In this manner, the linkage assembly 22 may be prevented from opening further as the handle 26 is moved into or out of engagement with the hood mount assembly 18.

The second pivot end 68 of each cam plate 60 and 62 are similarly spaced apart and include openings therein for receiving a fastener. The second pivot ends 68 are pivotally securable to an interior portion of the handle 26. Specifically, the second pivot end 68 of each cam plate 60 and 62 is positioned within the interior of the handle 26 such that the openings in each second pivot end 68 of the cam plates 60 and 62 align openings in a side portion of the handle 26. Thereafter, a fastener 72 is passed through each opening in the handle 26 and through the openings in each second pivot end 68 of the cam plates 60 and 62. As such, the cam link 50 is pivotally secured within the interior of the handle 26.

Figure 5A:
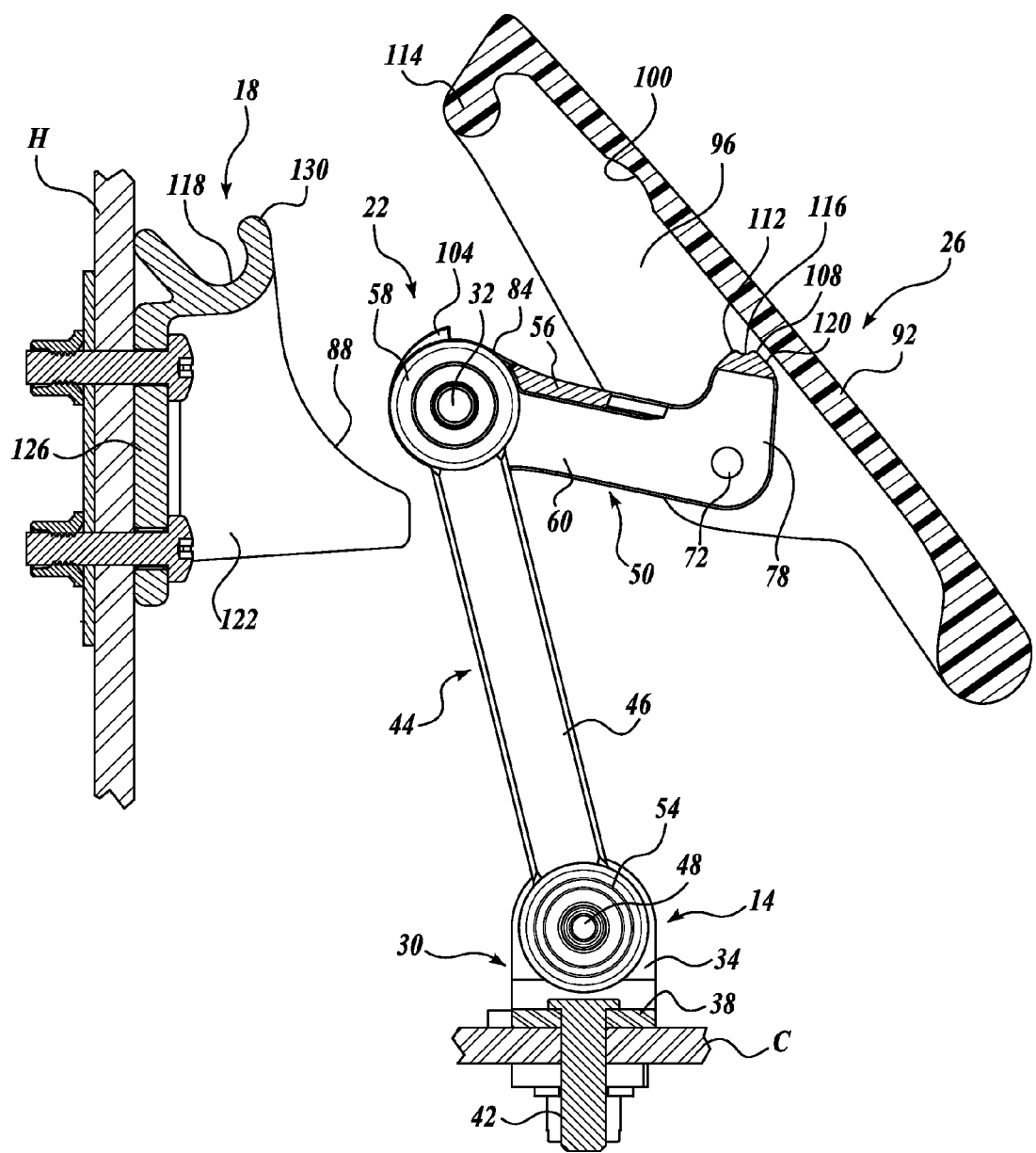
FIG. 5A is a cross-sectional view of the hood hold down device of FIG. 1 shown in a first position.
Figure 5B:
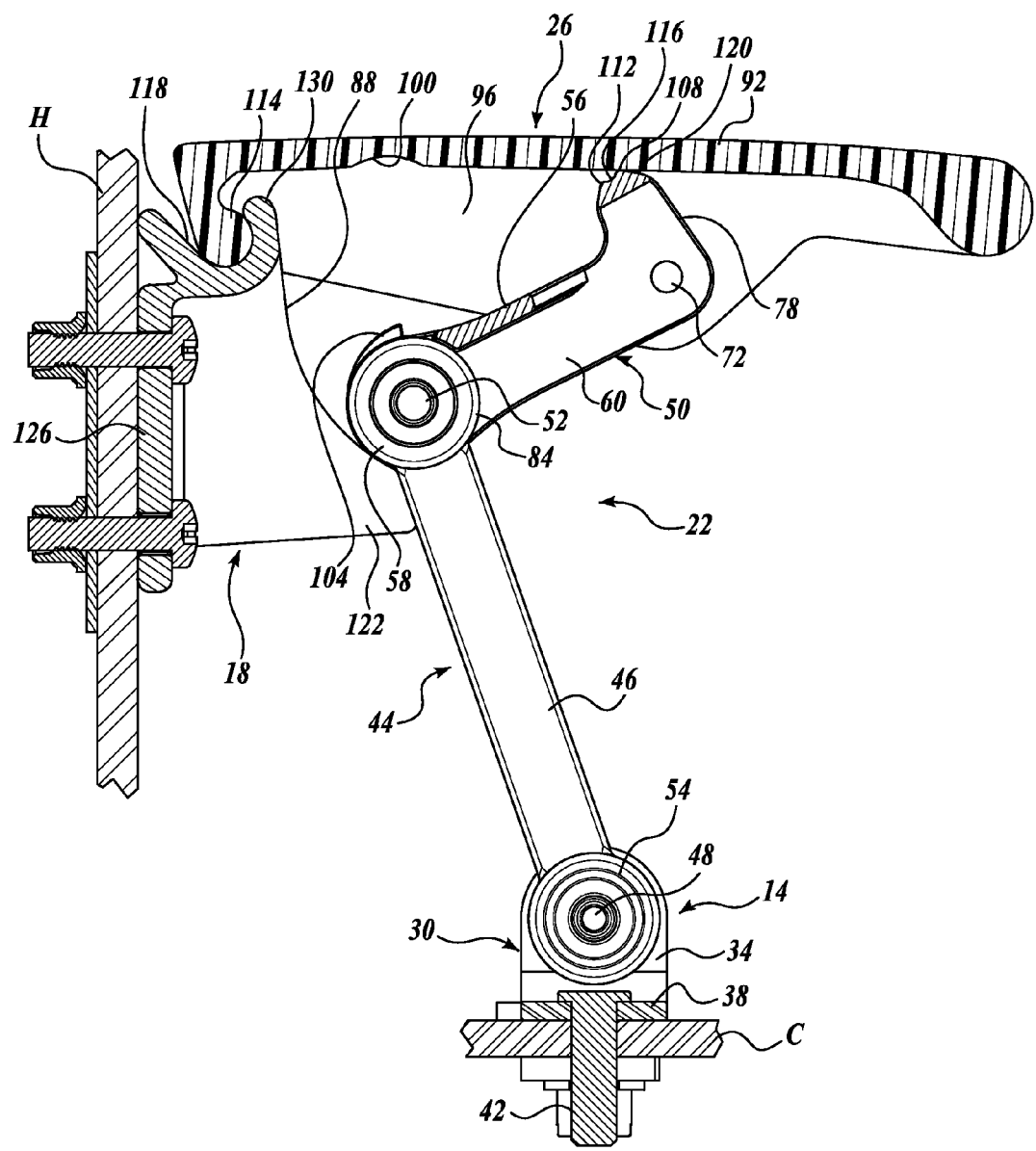
FIG. 5B is a cross-sectional view of the hood hold down device of FIG. 1 shown in a second position.
Figure 5C:
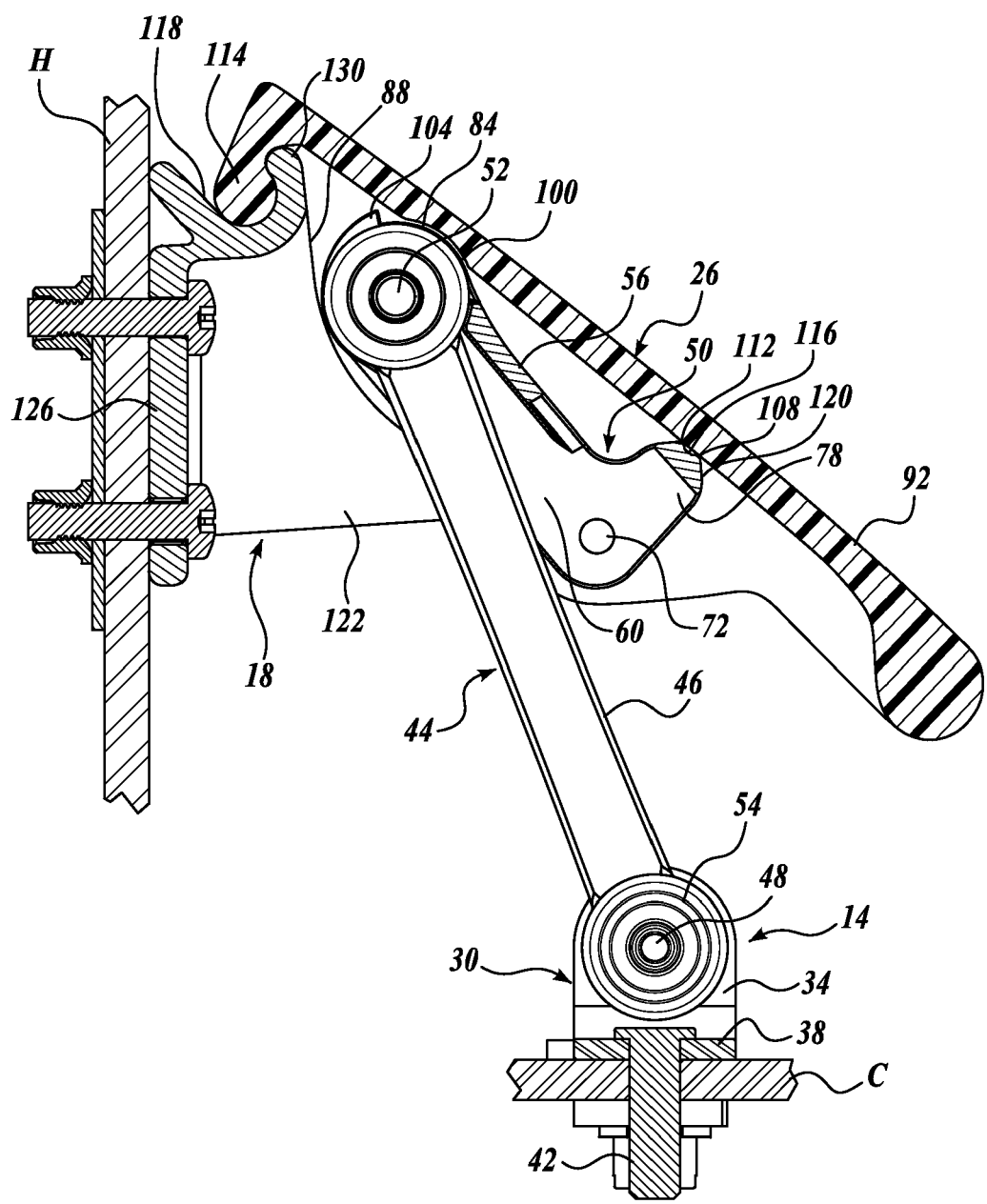
FIG. 5C is a cross-sectional view of the hood hold down device of FIG. 1 shown in a third position.

The cam link 50 includes cam features for engaging the handle 26 and the hood mount assembly 18 during the closure of the hood hold down device 10. Referring additionally to FIGS. 5A-5C, the first pivot ends 66 of each cam plate 60 and 62 have an enlarged circular profile to define a rounded ramp-engaging portion 84. The rounded ramp-engaging portion 84 defines a cam surface that is engageable with a ramp 88 of the hood mount assembly 18. The ramp-engaging portion 84 engages the hood mount assembly 18 to pull upwardly on the elastomeric link 44 as the handle 26 is pushed downwardly into the closed, locked position.

The second pivot ends 68 of each cam plate 60 and 62 has a substantially L-shaped profile to define a first cam protrusion 78 extending upwardly from the cam plate. A handle-engaging portion 80 extends between the first cam protrusions 78 of each cam plate 60 and 62 and has substantially the same profile as the first cam protrusions 78. The first cam protrusions 78 and handle-engaging portion 80 have a rounded exterior to define a cam surface that can move into and out of engagement with an interior surface of the handle 26.

The cam surface of the handle-engaging portion 80 may further be defined by first and second cam lock features 108 and 112 that protrude from the exterior surface of the handle-engaging portion 80. Disposed between the first and second cam lock features 108 and 112 is a recess 116 which separates and distinguishes the first and second cam lock features 108 and 112. Each of the first and second cam lock features 108 and 112 are engageable with the interior surface of the handle 26 when the handle 26 is moved between an open, unlocked position and a closed, locked position.

As shown in FIG. 5A, an inclined surface 120 extends from the first cam lock feature 108 in a direction away from the second cam lock feature 112. The inclined surface 120 has a predetermined incline and contour to engage the interior surface of the handle 26 when the handle is being moved between the open, unlocked position and the closed, locked position. With the inclined surface 120 engaged with the handle 26, the handle 26 is substantially held in its position relative to the linkage assembly 22 while moving the handle 26 into or out of engagement with the hood mount assembly 18 (see FIG. 5B).

Referring to FIGS. 5B and 5C, when the handle 26 is moved toward the hood mount assembly 18 into the closed, locked position, the handle 26 moves the cam link 50 clockwise about pin 52 through the connection at pin 72. As the cam link 50 is moved by the handle 26, the first cam lock feature 108 engages and pivots against the interior surface of the handle 26 until the handle 26 engages the second cam lock feature 112.

As the cam link 50 is moved more than half way past the center point of the pivot distance by the handle 26, the cam link 50 (which is engaging the ramp 88 of the hood mount assembly 18) urges the second cam lock feature 112 toward the handle 26. Thus, the cam locking feature 108 defines an over-center locking mechanism for urging the second locking feature 112 into engagement with the handle 26 and into the closed, locked position. Movement of the second cam lock feature 112 into engagement with the handle 26 produces a tactile sensation to the user to indicate that the handle 26 is in the closed, locked position.

Similarly, to move the handle 26 back into the open, unlocked position, the handle 26 is moved counterclockwise to move cam link 50 counterclockwise about pin 52. As the cam link 50 is moved by the handle 26, the first cam lock feature 108 pivots against the interior surface of the handle 26 until the second cam lock feature 112 disengages the handle 26. When the cam link 50 is moved more than half way past the center point of the pivot distance by the handle 26, the cam link 50 urges the second cam lock feature 112 away from the handle 26. Movement of the second cam lock feature 112 out of engagement with the handle 26 produces a tactile sensation to the user to indicate that the handle 26 is in the open, unlocked position.

Referring to FIG. 4 and FIGS. 5A-5C, the handle 26 will now be described in detail. The handle 26 may be any suitable or desired overall shape such that it is graspable and moveable by a user. In the depicted embodiment, the handle 26 has an overall substantially rectangular shape with a hollow interior. Specifically, the handle 26 includes an elongated body 92 and first and second side portions 94 and 96 extending downwardly from opposite lateral edges of the elongated body 92.

The elongated body 92 and the first and second side portions 94 and 96 define a bottom opening such that a portion of the linkage assembly 22 may be received within the hollow interior of the handle 26. In particular, and as described above, the first and second cam lock features 108 and 112 of the cam link 50 are engageable with the interior surface of the elongated body 92.

Referring to FIG. 5C, the ramp-engaging portion 84 of the cam link 50 may also be engageable with the interior surface of the elongated body 92 when the hood hold down device is in the closed, locked position. In that regard, a curved depression 100 may be defined within the interior surface of the elongated body 92 that is shaped and sized to partially receive the ramp-engaging portion 84 of the cam link 50. With the ramp-engaging portion 84 received within the curved depression 100, the handle 26 is positionable against the linkage assembly 22 when the handle 26 is in the closed, locked position.

The handle 26 further includes a latch protrusion 114 formed along the upper edge of the handle 26 that is designed for engaging and mating with the hood mount assembly 18. The latch protrusion 114 is defined by an overhanging edge that extends downwardly and slightly inwardly from the elongated body 92 of the handle 26. The latch protrusion 114 is sized and shaped to be received within and mate with a latch recess 118 on the hood mount assembly 18.

Referring to FIGS. 4 and 5A-5C, the hood mount assembly 18, which is securable to a portion of the hood H, is configured to mate with the handle 26 to releasably secure the hood H to the cab C. The hood mount assembly 18 includes a body 122 having a hood engaging portion 126 that is securable to the hood H in any suitable manner, such as with a plurality of fasteners. The body 122 further includes a ramp 88 that is suitable shaped to define a cam surface for engaging the ramp-engaging portions 84 of the cam link 50. The ramp 88 is defined opposite the hood engaging portion 126 such that it is positioned to be engaged by the ramp-engaging portions 84 of the cam link 50 when the handle 26 is being used to close the hood hold down device 10. In that regard, an opening may be defined in the ramp 88 to receive the elongated body 46 of the elastomeric link 44 as the ramp-engaging portions 84 of the cam link 50 are moved along the ramp 88.

A latch recess 118 is defined on the upper end of the body 122 and is sized and shaped to receive the latch protrusion 114 of the handle 26 therein. The latch recess 118 defines a lip 130 that retains the latch protrusion 114 within the latch recess 118 when the handle 26 is engaged therewith.

The hood mount assembly 18 may be made from any suitable material well known in the art. As a non-limiting example, the hood mount assembly 18 is made from a suitable plastic or similar material to minimize friction between the hood mount assembly 18 and the other components of the hood hold down device 10 (such as the handle 26 and the cam link 50) when the hood hold down device 10 is being open or closed.

Referring to FIGS. 5A-5C, the operation of the hood hold down device 10 for releasably securing the hood H to the cab C will be hereinafter described. FIG. 5A depicts the hood hold down device 10 in an open, unlocked position with the hood H detached from the cab C. To move the hood hold down device 10 into a closed, locked position, the handle 26 is lifted upwardly toward the hood mount assembly 18. As the handle 26 is lifted upwardly, the handle 26 moves the cam link 50 about pin 52 away from the elastomeric link 44. The cam link 50 pivots about pin 52 in a counterclockwise direction until the cam link 50 engages stop 104.

The handle 26 may also pivot about the axis defined by pins 72 to position the handle 26 for engagement with the hood mount assembly 18. The handle 26 may pivot about the pins 72 until the interior surface of the elongated body 92 engages the inclined surface 120 of the first cam lock feature 108 on the cam link 50. With the first cam lock feature 108 positioned against the interior surface of the handle 26 and with the cam link 50 substantially fixed relative to the elastomeric link 44, the handle 26 and linkage assembly 22 can be moved together toward the hood mount assembly 18.

The handle 26 is moved towards the hood mount assembly 18 until the latch protrusion 114 of the handle 26 is positioned above the latch recess 118 of the hood mount assembly 18. As the handle 26 is moved into this position, the rounded ramp-engaging portion 84 moves into engagement with the ramp 88 of the hood mount assembly 18.

The latch protrusion 114 of the handle 26 is disposed within the latch recess 118 of the hood mount assembly 18 and the handle 26 is pushed downwardly (or rotated clockwise about an axis defined by the mating of the latch protrusion 114 with the latch recess 118) to pivot the cam link 50 about pin 52 clockwise toward the elastomeric link 44. The cam link 50 is moved clockwise toward the elastomeric link 44 by the handle 26 until the pivot defined by pins 72 move downwardly past the pivot defined by pin 52. At this point, the position of the cam link 50 against the ramp 88 urges the handle 26 counterclockwise about latch protrusion 114 into the closed position. Thus, the linkage assembly 22 together with the positioning of the handle 26 relative to the hood mount assembly 18 provides a mechanical advantage when closing the hood hold down device 10.

As the cam link 50 is being moved clockwise toward the elastomeric link 44 by the handle 26, the cam link 50 imposes an axial pulling force on the elastomeric link 44. The downward force on the handle 26 moves the rounded ramp-engaging portion 84 upwardly along the ramp 88 of the hood mount assembly 18 to stretch the elastomeric link 44 and produce tension within the elastomeric link 44. Thus, the cam link 50 and handle 26 act as a second linkage assembly to produce tension within the elastomeric link 44. In that regard, the handle 26 may also be referred to as a tensioning lever.

As the handle 26 is pushed downwardly, it engages the first cam lock feature 108 of the cam link 50. As described above, the first cam lock feature 108 pivots against the interior surface of the handle 26 until the handle 26 engages the second cam lock feature 112. When the cam link 50 is moved more than half way past the center point of the pivot distance by the handle 26, the cam link 50 urges the second cam lock feature 112 toward the handle 26. Movement of the second cam lock feature 112 into engagement with the handle 26 produces a tactile sensation to the user to indicate that the handle 26 is in the closed, locked position.

In this closed, locked position, the handle 26 is seated against the cam link 50, and the cam link 50 imposes an axial pulling force on the elastomeric link 44. As such, the handle 26 retains a firm hold on the hood mount assembly 18 to securely fasten the hood H to the cab C. Moreover, the elasticity of the elastomeric link 44 accommodates vibrations and movements between the cab C and the hood H. More specifically, when the cab C vibrates or moves relative to the hood H, the elastomeric link 44 can bend, stretch, twist, etc., to accommodate such vibration or movement without causing the hood hold down device 10 to open or unlock.

In that regard, the hood hold down device 10 may also be locked when the mounting surface of the cab C is not oriented at a ninety degree (90°) angle relative to the mounting surface of the hood H or when the cab C and hood H are misaligned (or vice versa).

Figure 6:
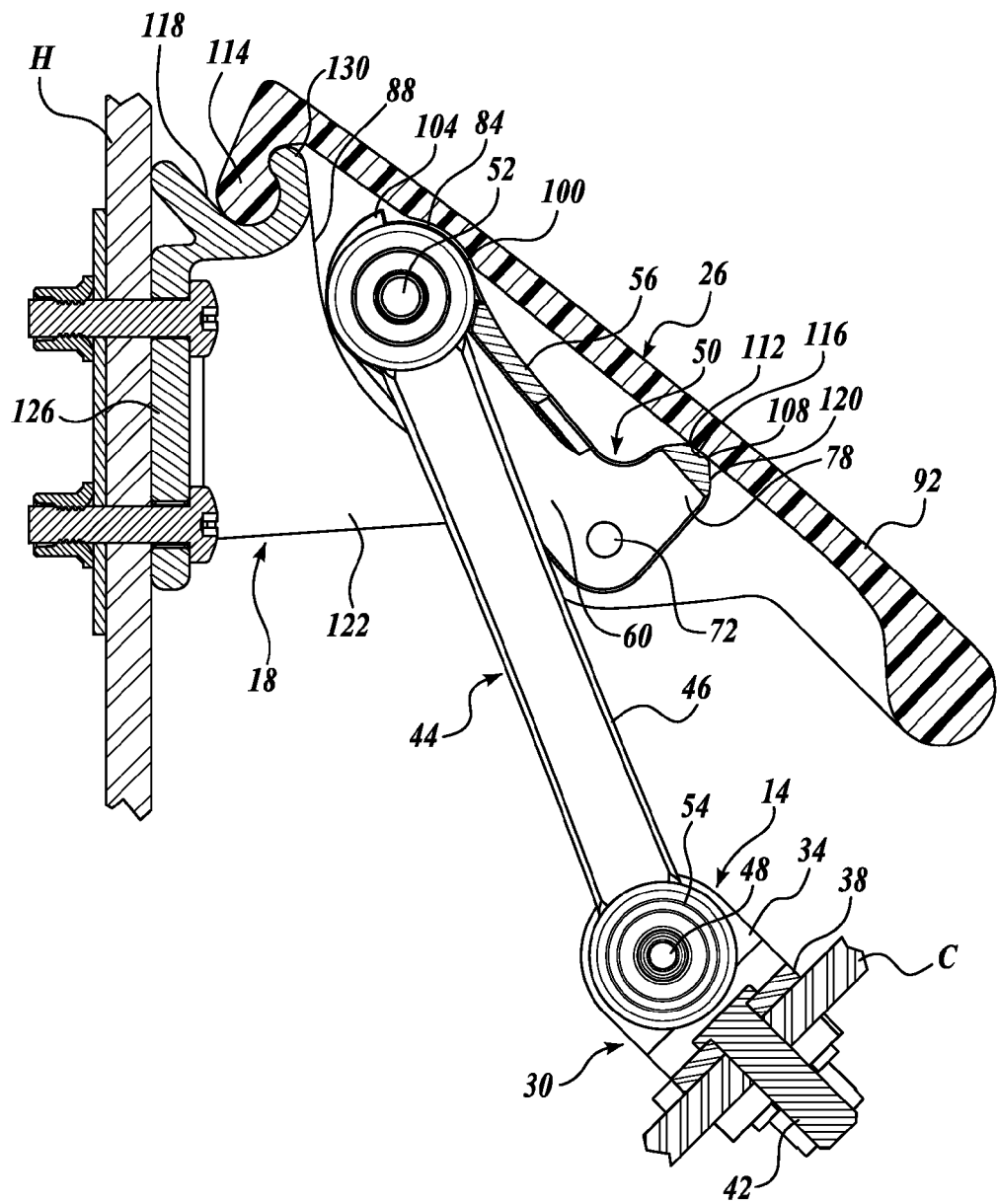
FIG. 6 is a cross-sectional view of the hood hold down device of FIG. 1 shown in a fourth position.

Referring to FIG. 6, the mounting surface of the cab C is shown oriented at about a forty-five (45°) angle relative to the mounting surface of the hood H. The elastomeric link 44 can pivot about pin 48 at the cab mount assembly 30 to properly orient the linkage assembly 22 and the handle 26 for engagement with the hood mount assembly 18. The elastomeric link 44 may also stretch as needed or move within the opening in the ramp 88 as needed when the hood hold down device 10 is moved into the open or closed position. The same can occur when the hood hold down device 10 is in the closed, locked position and the orientation of the mounting surfaces changes. Accordingly, it can be appreciated that when the mounting surfaces of the cab C and hood H are not transverse to one another (or when they change orientation), the hood hold down device 10 may still be moved into the open or closed position or may remain fixed in the closed, locked position.

The cab C may also become misaligned relative to the hood H when the gap between the hood H and cab C is greater than desired, or when the cab C and hood H are offset laterally relative to one another. If such misalignment occurs, the handle 26 may be engaged with the hood mount assembly 18 and moved into the closed, locked position as described above. However, in this instance, the elastomeric link 44 may twist, deform, or stretch to accommodate the misalignment of the cab C relative to the hood H. As a specific example, if the gap between the hood H and cab C is too large, the handle 26 can "reach up" and pull the hood H toward the cab C, using the handle 26 and elastomeric link 44 as a fulcrum, to secure the hood H to the cab C and decrease the gap between the hood H and the cab C. The elastomeric link 44 may similarly twist, deform, or stretch if the hood H and cab C become misaligned when the hood hold down device 10 is in the closed, locked position.

Referring back to FIGS. 5A-5C, to move the hood hold down device back into the open, unlocked position, the handle 26 is lifted upwardly away from the cab mount assembly 14. As the handle 26 is lifted upwardly, the handle 26 pulls upwardly on the cam link 50 and moves the cam link 50 counterclockwise about pin 52 away from the elastomeric link 44. As the cam link 50 pivots about pin 52 in a counterclockwise direction, the elastomeric link 44 pulls downwardly on the rounded ramp-engaging portion 84. The rounded ramp-engaging portion 84 slides downwardly along the ramp 88 of the hood mount assembly 18 to decrease the tension in the elastomeric link 44.

The downward sliding movement of the rounded ramp-engaging portion 84 along the ramp 88 causes the cam link 50 to pivot counterclockwise about pin 52. This downward sliding movement urges the handle 26 upwardly in a counterclockwise direction about the pivot point defined by the latch protrusion 114. Accordingly, the elasticity in the elastomeric link 44 assists the user in moving the handle 26 into the open, unlocked position.

As the cam link 50 and handle 26 pivot counterclockwise, the first cam lock feature 108 pivots against the interior surface of the handle 26 to move the second cam lock feature 112 out of engagement with the handle 26. When the cam link 50 is moved more than half way past the center point of the pivot distance by the handle 26, the cam link 50, through the tension in the elastomeric link 44, urges the second cam lock feature 112 away from the handle 26. Movement of the second cam lock feature 112 out of engagement with the handle 26 produces a tactile sensation to the user to indicate that the handle 26 is in the open, unlocked position. In this open, unlocked position, the latch protrusion 114 of the handle 26 can be disconnected from the latch recess 118 of the hood mount assembly 18 to completely disconnect the cab C from the hood H.

While illustrative embodiments have been illustrated and described, it will be appreciated that various changes can be made therein without departing from the spirit and scope of the invention. Moreover, it should be appreciated that the foregoing steps for moving the hood hold down device 10 into the closed, locked position or the open, unlocked position can instead be carried out in any other suitable manner or in any suitable order.

The embodiments of the present disclosure in which an exclusive property or privilege is claimed are defined as follows:

1. A hood hold down device for securing a vehicle hood to a cab, comprising:
   (a) a cab mount assembly securable to a portion of the cab and a hood mount assembly securable to a portion of the hood;
   (b) a handle releasably securable to the hood mount assembly; and
   (c) a linkage assembly having an elastomeric link moveably secured to a cam link, the elastomeric link moveably coupled to the cab mount assembly and the cam link moveably coupled to the handle;
   wherein the elastomeric link is pivotally coupled to the cab mount assembly about a first pivot axis, and the cam link is pivotally coupled to the elastomeric link about a second pivot axis substantially parallel to the first pivot axis;
   wherein the handle is pivotally coupled to the cam link about a third pivot axis substantially parallel to the first and second pivot axes;
   wherein the handle is moveable between an unlocked position and a middle position, wherein in the middle position a portion of the handle is pivotally coupled to the hood mount assembly about a fourth pivot axis substantially parallel to the first, second, and third axes, and wherein the handle is moveable about the fourth pivot axis from the middle position to a lock position, thereby securing the hood to the cab; and
   wherein the linkage assembly is engageable with a portion of the hood mount assembly as the handle engages the hood mount assembly to releasably secure the hood to the cab.

2. The hood hold down device of claim 1, wherein the movement of the handle about the fourth pivot axis imposes a torque on the cam link.

3. The hood hold down device of claim 2, wherein the torque imposed on the cam link imposes an axial force in the elastomeric link when the cam link is engaged with the hood hold down device.

4. The hood hold down device of claim 3, wherein the axial force in the elastomeric link urges the handle into the middle position when the handle is moved about the fourth pivot axis from the locked position.

5. The hood hold down device of claim 3, wherein the engagement of the cam link with the hood hold down device urges the handle into the locked position when the handle is moved about the fourth pivot axis.

6. The hood hold down device of claim 1, wherein the cam link includes at least one cam lock feature configured to provide tactile sensation to a user when the handle is moved into the unlocked position or the locked position.

7. The vehicle of claim 1, wherein the movement of the handle about the fourth pivot axis imposes a torque on the cam link.

8. The vehicle of claim 7, wherein the torque imposed on the cam link imposes an axial force in the elastomeric link when the cam link is engaged with the hood hold down device.

9. The vehicle of claim 8, wherein the axial force in the elastomeric link urges the handle into the middle position when the handle is moved about the fourth pivot axis from the locked position.

10. The vehicle of claim 8, wherein the engagement of the cam link with the hood hold down device urges the handle into the locked position when the handle is moved about the fourth pivot axis.

11. The hood hold down device of claim 1, wherein the elastomeric link includes a stop engageable with the cam link that substantially fixes the position of cam link relative to the elastomeric link when the handle is moved from the middle position to the unlocked position.

12. A vehicle, comprising:
   (a) a chassis;
   (b) a cab mounted to the chassis;
   (c) a hood positioned adjacent the cab; and
   (d) a hood hold down device for securing the hood to the cab, comprising:
      (i) a cab mount assembly securable to a portion of the cab and a hood mount assembly securable to a portion of the hood;
      (ii) a handle releasably securable to the hood mount assembly; and
      (iii) a linkage assembly having an elastomeric link moveably coupled to a cam link, the elastomeric link moveably coupled to the cab mount assembly and the cam link moveably coupled to the handle;

wherein the elastomeric link is pivotally coupled to the cab mount assembly about a first pivot axis, and the cam link is pivotally coupled to the elastomeric link about a second pivot axis substantially parallel to the first pivot axis;
   wherein the handle is pivotally coupled to the cam link about a third pivot axis substantially parallel to the first and second pivot axes;
   wherein the handle is moveable between an unlocked position and a middle position, wherein in the middle position a portion of the handle is pivotally coupled to the hood mount assembly about a fourth pivot axis substantially parallel to the first, second, and third axes, and wherein the handle is moveable about the fourth pivot axis from the middle position to a lock position, thereby securing the hood to the cab; and
   wherein the linkage assembly is engageable with a portion of the hood mount assembly as the handle engages the hood mount assembly to releasably secure the hood to the cab.

13. The vehicle of claim 12, wherein the cam link includes at least one cam lock feature configured to provide tactile sensation to a user when the handle is moved into the unlocked position or the locked position.

14. The vehicle of claim 12, wherein the elastomeric link includes a stop engageable with the cam link that substantially fixes the position of cam link relative to the elastomeric link when the handle is moved from the middle position to the unlocked position.

* * * * *